United States Patent
Yang et al.

(10) Patent No.: US 10,396,981 B2
(45) Date of Patent: *Aug. 27, 2019

(54) PRE-PERSONALIZATION OF ELECTRONIC SUBSCRIBER IDENTITY MODULES

(71) Applicant: Apple Inc., Cupertino, CA (US)

(72) Inventors: Xiangying Yang, Cupertino, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/279,343

(22) Filed: Sep. 28, 2016

(65) Prior Publication Data
US 2017/0093565 A1    Mar. 30, 2017

Related U.S. Application Data

(60) Provisional application No. 62/235,503, filed on Sep. 30, 2015.

(51) Int. Cl.
*H04L 9/32* (2006.01)
*H04L 9/08* (2006.01)
(Continued)

(52) U.S. Cl.
CPC .......... *H04L 9/0822* (2013.01); *H04L 9/0838* (2013.01); *H04L 63/0435* (2013.01);
(Continued)

(58) Field of Classification Search
CPC ....... H04W 12/04; H04W 8/183; H04W 8/20; H04W 8/205; H04W 4/60; H04L 61/6054; H04L 2209/24
(Continued)

(56) References Cited

U.S. PATENT DOCUMENTS

| | | | |
|---|---|---|---|
| 2008/0181395 A1* | 7/2008 | Okada | H04L 9/0631 380/28 |
| 2011/0022856 A1 | 1/2011 | Ureche et al. | |

(Continued)

FOREIGN PATENT DOCUMENTS

EP    2448215 A1    5/2012

OTHER PUBLICATIONS

CSMG, Sep. 25, 2012, Reprogrammable SIM, pp. 1-95. (Year: 2012).*

(Continued)

*Primary Examiner* — Luu T Pham
*Assistant Examiner* — Jenise E Jackson
(74) *Attorney, Agent, or Firm* — Dickinson Wright RLLP

(57) ABSTRACT

Methods for provisioning electronic Subscriber Identity Modules (eSIMs) to electronic Universal Integrated Circuit Cards (eUICCs) are provided. One method involves a provisioning server configured to encrypt the eSIM with a symmetric key (Ke). The provisioning server, upon identifying a target eUICC, encrypts the symmetric key with a key encryption key (KEK) derived based at least in part on a private key associated with the provisioning server and a public key associated with the target eUICC. The provisioning server generates an eSIM package including the encrypted eSIM, the encrypted symmetric key, a public key corresponding to the private key associated with the provisioning server, as well as additional information that enables the target eUICC to, upon receipt of the eSIM package, identify a private key that corresponds to the public key associated with the target eUICC and used to derive the KEK.

20 Claims, 9 Drawing Sheets

(51) Int. Cl.
*H04W 12/04* (2009.01)
*H04L 29/06* (2006.01)
*H04W 8/20* (2009.01)
*H04W 12/02* (2009.01)
*H04W 12/06* (2009.01)

(52) U.S. Cl.
CPC ........... *H04W 8/205* (2013.01); *H04W 12/02* (2013.01); *H04W 12/04* (2013.01); *H04W 12/06* (2013.01); H04L 2209/80 (2013.01); H04L 2463/062 (2013.01)

(58) Field of Classification Search
USPC .......................................................... 713/171
See application file for complete search history.

(56) References Cited

U.S. PATENT DOCUMENTS

| | | | |
|---|---|---|---|
| 2014/0082358 A1 | 3/2014 | Nakhjiri et al. | |
| 2014/0082359 A1* | 3/2014 | Nakhjiri ............... | H04L 9/0822 713/168 |
| 2014/0106714 A1* | 4/2014 | Frank .................. | H04L 63/0853 455/411 |
| 2014/0219447 A1* | 8/2014 | Park ...................... | H04W 12/08 380/247 |
| 2014/0229339 A1* | 8/2014 | Massiere ............ | G06Q 20/3229 705/26.81 |
| 2015/0126153 A1* | 5/2015 | Spitz .................... | H04M 1/675 455/411 |
| 2016/0269386 A1* | 9/2016 | Nix ....................... | H04L 9/0869 |
| 2017/0289792 A1* | 10/2017 | Park ..................... | H04L 67/303 |

OTHER PUBLICATIONS

Daghmechi et al, Implementing Geo-encryption in GSM Cellular Network, 2012, IEEE, pp. 299-302.*
Paik et al, Stragglers of the Herd Get Eaten: Security Concerns for GSM Mobile Banking Applications, 2010, ACM, pp. 1-6.*
European Patent Application 16191562.4—Extended European Search Report dated Feb. 14, 2017.
Rescorla; "Diffie-Hellman Key Agreement Method"; Network Working Group, RFC 2631, Internet Society (ISOC) 4, Rue Des Falaises CH-1205 Geneva, Switzerland, CH, Jun. 1999, 14 pages.

* cited by examiner

PRE-PERSONALIZATION OF ELECTRONIC SUBSCRIBER IDENTITY MODULES

CROSS-REFERENCE TO RELATED APPLICATIONS

The present application claims the benefit of U.S. Provisional Application No. 62/235,503, entitled "PRE-PERSONALIZATION OF ELECTRONIC SUBSCRIBER IDENTITY MODULES" filed Sep. 30, 2015, the content of which is incorporated herein by reference in its entirety for all purposes.

FIELD

The described embodiments relate generally to wireless communications technology. More particularly, the embodiments relate to preparing and provisioning electronic Subscriber Identity Modules (eSIMs) to embedded Universal Integrated Circuit Cards (eUICCs) included in wireless communication devices.

BACKGROUND

Wireless communication devices, such as smart phones, have traditionally been configured to utilize Universal Integrated Circuit Cards (UICCs) that provide access to wireless network services. A UICC typically takes the form of a small removable card (e.g., a Subscriber Identity Module (SIM) card) that is inserted into a wireless communication device. In most cases, each UICC is associated with a single "Issuer"—such as a mobile network operator (MNO)—that controls the programming and distribution of the UICC.

In more recent implementations, non-removable UICCs—referred to herein as embedded UICCs (eUICCs)—are being included on system boards of wireless communication devices. These eUICCs are distinct from the traditional removable UICCs in that the eUICCs are non-removable and soldered to the system boards of wireless communication devices. In some cases, an eUICC can be programmed with one or more eSIMs, each of which can emulate and replicate the architecture of a typical SIM to enable a wireless communication device (including the eUICC) to access services provided by different MNOs.

Notably, the use of eUICCs and eSIMs can offer significant advantages over traditional/removable UICCs. For example, the use of an eUICC can provide wireless communication device manufacturers with increased flexibility in design due to the lack of a requirement to accommodate the size and form factor of a removable SIM card. As a further example, the ability to remotely provision (e.g., over-the-air) eSIMs can provide convenience for consumers and vendors when configuring a wireless communication device to access a mobile network operator's network.

Notably, traditional approaches for securely preparing and provisioning eSIMs to eUICCs fail to address scalability issues. In particular, situations in which a provisioning server is tasked with concurrently provisioning eSIMs to a large number (e.g., on the order of millions) of eUICCs involves carrying out real-time encryption of each eSIM with a key that is specific to a target eUICC to which the eSIM is being provisioned. This approach prevents the ability to encrypt eSIMs prior to provisioning sessions with target eUICCs as the keys specific to the target eUICCs are not accessible to the provisioning server until the target eUICCs are brought online. The overhead required to perform the key derivation and encrypt the eSIM in real-time during provisioning sessions is problematic in terms of system scalability during periods in which the provisioning service is concurrently provisioning eSIMs to several eUICCs, such as around the time of a release of a new wireless communication device.

SUMMARY

One approach that can be used to reduce the foregoing deficiencies involves pre-encrypting eSIMs prior to the identification of target eUICCs to which the eSIMs are to be provisioned. In particular, this approach involves encrypting an eSIM with a randomly-generated symmetric key that is not specific to a target eUICC. In turn, a target eUICC is identified (e.g., during its manufacture), a key (e.g., an ephemeral public key) that is specific to the target eUICC is obtained, and the symmetric key is encrypted with a key encryption key (KEK) that is derivable by the target eUICC (e.g., in accordance with a key agreement protocol). In turn, an eSIM package—which includes the encrypted symmetric key and the encrypted eSIM—is sent to the target eUICC, whereupon the target eUICC can decrypt the encrypted symmetric key and use the symmetric key to decrypt the encrypted eSIM. In this manner, when the target eUICC is brought online (e.g., at a time of purchase of a wireless communication device that includes the target eUICC), a majority of the processing-intensive work is already completed and the eSIM can be provisioned to the eUICC with less overhead in comparison to traditional approaches.

Notably, and in some cases, it can be desirable to pre-encrypt two or more eSIMs for a target eUICC, especially in situations where the primary mobile network operator that will be utilized by the target eUICC is unknown. Unfortunately, utilizing the foregoing approach to pre-encrypt two or more eSIMs for a target eUICC can result in configurations where the target eUICC is incapable of establishing a provisioning session to retrieve and properly decrypt a particular eSIM of the two or more eSIMs. In particular, as a different ephemeral public key (generated by the eUICC) is used by the provisioning server to pre-encrypt each eSIM, it is not immediately clear to the target eUICC which corresponding ephemeral private key should be used to properly decrypt an eSIM upon receipt. In other words, the eUICC receives an eSIM that is encrypted, at least based in part, on an ephemeral public key previously generated by the eUICC, but the ephemeral public key cannot be identified by the eUICC using the received eSIM. Consequently, the eUICC's inability to identify the ephemeral public key—and, implicitly, the ephemeral private key that corresponds to the ephemeral public key—renders the eUICC incapable of decrypting the eSIM. As a result, existing approaches are restricted to pre-encrypting only a single eSIM for a target eUICC, which severely limits overall flexibility with respect to the manufacture and distribution of wireless communication devices.

To cure the foregoing deficiencies, the embodiments described herein set forth different approaches for enabling multiple eSIMs to be pre-encrypted for a target eUICC in a manner that enables the target eUICC to receive and decrypt different eSIMs provided by provisioning servers.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
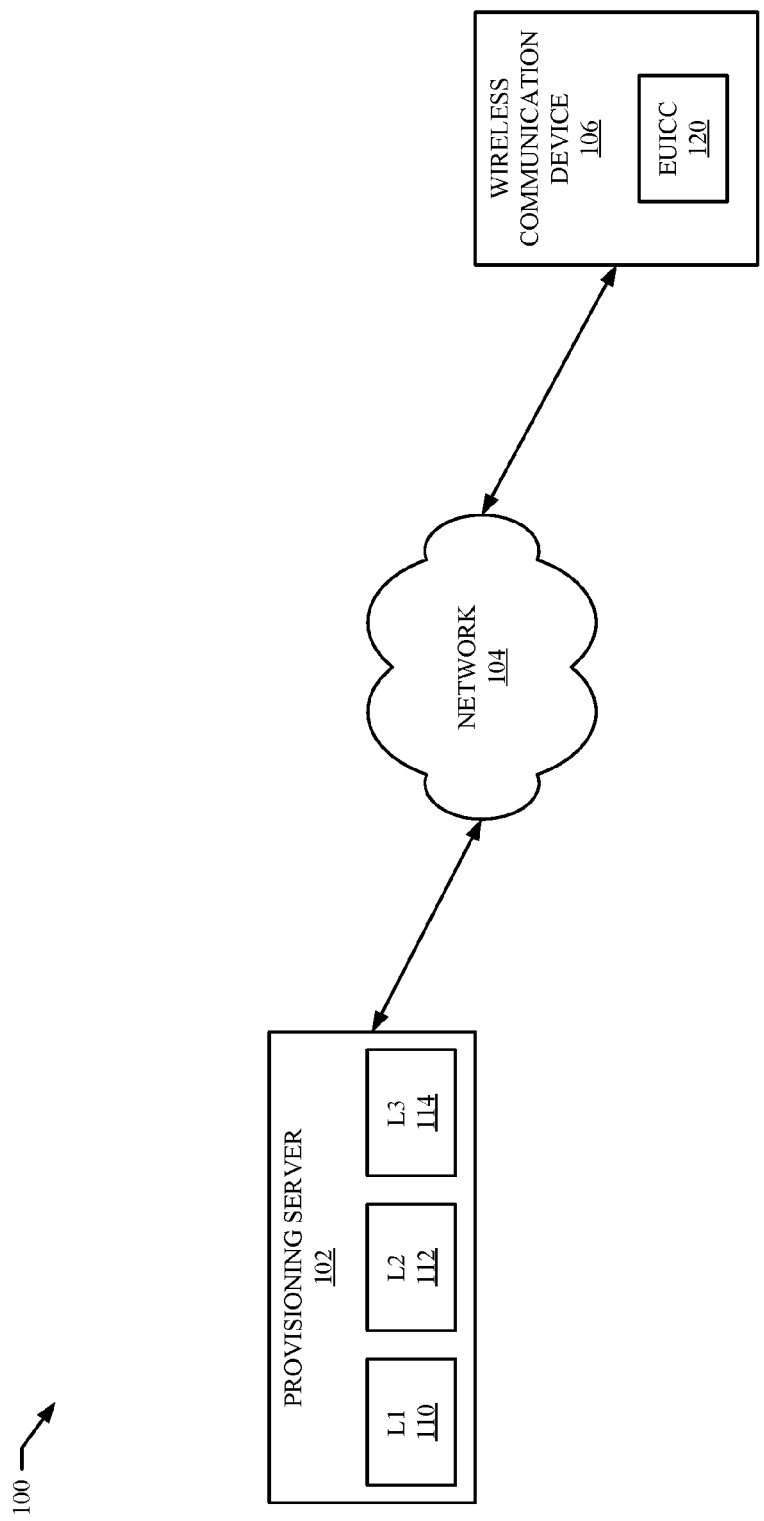
FIG. 1 illustrates an example system for eSIM provisioning in accordance with some example embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As previously described herein, it can be desirable to pre-encrypt multiple eSIMs for a target eUICC, especially in situations where the primary mobile network operator that ultimately will be utilized by the target eUICC is unknown. For example, it can be desirable to manufacture a wireless communication device that, when purchased by a consumer, provides a streamlined way to enable the consumer to select among a variety of mobile network operators and access wireless services provided by the selected mobile network operator. To provide this functionality, the embodiments described herein set forth three different approaches that enable multiple eSIMs to be pre-encrypted for a target eUICC in a manner that enables at least one of the eSIMs to be provided to, decrypted by, and utilized by the wireless communication device in a secure, robust, and efficient way.

A first approach described herein involves utilizing Profile Issuer Security Domains (ISD-Ps) to store different ephemeral key pairs within an eUICC. More specifically, the ephemeral public key included in an ephemeral key pair, when provided to a provisioning server (e.g., at a time of manufacture of the eUICC), is accompanied with a unique identifier associated with the ISD-P in which the ephemeral key pair is stored. In turn, when the provisioning server provides an eSIM to a target eUICC in an encrypted form (using the ephemeral public key), the eSIM is accompanied with the unique identifier, thereby enabling the target eUICC to identify the appropriate ephemeral private key for decrypting the eSIM.

A second approach described herein involves configuring a provisioning server to provide a copy of the ephemeral public key used to encrypt an eSIM when the encrypted eSIM is being delivered to a target eUICC. In this manner, and upon receipt of the encrypted eSIM and the copy of the ephemeral public key, the target eUICC can identify a corresponding ephemeral private key and properly decrypt the encrypted eSIM.

A third approached described herein involves configuring a target eUICC to exploit a Message Authentication Code (MAC) when delivering an encrypted eSIM to a target eUICC via an eSIM package. In particular, the eSIM package can include a MAC protected partition configured to store information that is associated with, unique to, and known to the target eUICC. In this manner, when the target eUICC receives the eSIM package, the target eUICC can cycle through available ephemeral private keys of previously-generated key pairs (e.g., at manufacture time), and use each ephemeral private key to attempt to verify and match the MAC. In turn, when a match occurs, the target eUICC has successfully identified the key pair involved in encrypting the eSIM included in the eSIM package—specifically, the public ephemeral key—thereby enabling the target eUICC to decrypt and install the eSIM using the corresponding ephemeral private key.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) radio access technologies (RATs). In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates an example system 100 for eSIM provisioning in accordance with some example embodiments. The system 100 can include a provisioning server 102 and one or more wireless communication devices 106, which can communicate over a network 104. According to some embodiments, the provisioning server 102 can be embodied as one or more computing devices that can be configured to generate and/or provision eSIMs to eUICCs (e.g., eUICC 120) implemented on wireless communication devices 106 in accordance with various example embodiments. The provisioning server 102 can, for example, comprise one or more physical servers, a cloud computing infrastructure configured to implement functionality of the provisioning server 102 (e.g., a virtual computing system implemented on underlying physical hardware), and/or other server device(s). In embodiments in which functionality of the provisioning server 102 is provided by multiple physical computing devices, the computing devices can be co-located in a common location, or can be distributed across multiple physical locations and can communicate via the network 104. The provisioning server 102 can be hosted/operated by any entity that can maintain and provision a pool of eSIMs, such as by way of non-limiting example, mobile network operators, device manufacturers, device vendors, or other such entities.

The network 104 can be embodied as any network or combination of networks configured to support communication between two or more computing devices, such as provisioning server 102 and the wireless communication device 106. By way of non-limiting example, the network 104 can comprise one or more wireline networks, one or more wireless networks (e.g., cellular networks, wireless local area networks, wireless wide area networks, wireless metropolitan area networks, some combination thereof, or the like), or a combination thereof, and in some example embodiments can comprise the Internet.

The wireless communication device 106 can be embodied as any computing device that can be configured to access a cellular network. By way of non-limiting example, the wireless communication device 106 can be embodied as a cellular phone, such as a smart phone, a tablet computing device, a digital media player device, a cellular wireless hotspot device, a laptop computer, some combination thereof, or the like. As a further example, the wireless communication device 106 can be embodied as a machine-to-machine (M2M) device or the like that can be configured (e.g., via a SIM) to access a cellular network.

The wireless communication device 106 can include an eUICC 120, which can also be referred to as a "secure element." In some embodiments, the eUICC 120 can be embedded within (e.g., soldered to) a main system board of the wireless communication device 106. In some example embodiments, the eUICC 120 can comprise a sandboxed hardware/software environment that cannot be directly accessed by external entities, such as a main operating system (OS) that executes on the wireless communication device 106. The eUICC 120 can include processing circuitry, such as a microprocessor, and a storage device that can work together to process commands and carry out various authentication mechanisms that can be used to enable the wireless communication device 106 to access a mobile network operator's network. In this regard, the eUICC 120 can be configured to maintain one or more eSIMs, such as an eSIM that can be provisioned by the provisioning server 102. The eUICC 120 can be configured to use an eSIM installed on the eUICC 120 to facilitate network authentication for accessing a mobile operator's network.

The wireless communication device 106, and thus an eSIM that can be provisioned by the provisioning server 102 and/or installed on the eUICC 120 can be configured for accessing networks using any of a variety of radio access technologies (RATs). By way of non-limiting example, the wireless communication device 106 and/or an eSIM in accordance with some example embodiments can support a Long Term Evolution (LTE) radio access technology (RAT), such as various releases of the LTE standard specified by the Third Generation Partnership Project (3GPP), including various releases of LTE, LTE-Advanced (LTE-A), and/or other present or future releases using LTE technology. As another example, the wireless communication device 106 and/or an eSIM in accordance with some example embodiments can support a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1xRTT; and/or the like. As another example, the wireless communication device 106 and/or an eSIM in accordance with some example embodiments can support a second generation (2G) cellular RAT, such as a Global System for Mobile Communications (GSM) RAT. It will be appreciated that the foregoing RATs are provided by way of example, and not by way of limitation. In this regard, the wireless communication device 106 and/or an eSIM in accordance with some example embodiments can be configured to communicate via any present or future developed cellular RAT, including, for example, various RATs in development.

As described herein, the provisioning server 102 can be configured to provision an eSIM to the eUICC 120 via the network 104. This provisioning can, for example, be accomplished using various over-the-air (OTA) techniques. Additionally or alternatively, in some example embodiments, the wireless communication device 106 can be connected to the network 104 and/or directly to the provisioning server 102 via a wireline connection and an eSIM can be provisioned to the eUICC 120 via the wireline connection. An eSIM provisioned to the eUICC 120 can be included in an eSIM package that can be generated and formatted by the provisioning server 102 in accordance with various embodiments described further herein below. The eUICC 120 can be configured to unpack the eSIM from the eSIM package and install the eSIM on the eUICC 120.

In some example embodiments, the provisioning server 102 and eUICC 120 can be configured to implement and/or otherwise support one or more logical security layers that can implement security mechanisms for the provisioning process. For example, the provisioning server 102 of some example embodiments can be configured to implement one or more of a level 1 (L1) entity 110, level 2 (L2) entity 112, or level 3 (L3) entity 114. The eUICC 120 of some example embodiments can locally implement logical security layers and/or processes (e.g., L1, L2, and/or L3) corresponding to the logical security entities of the provisioning server 102. In accordance with some example embodiments, L1 (e.g., the L1 entity 110 and any corresponding L1 layer/process on the eUICC 120) can provide encryption services; L2 (e.g., the L2 entity 112 and any corresponding L2 layer/process on the eUICC 120) can provide anti-cloning services; and L3 (e.g., the L3 entity 114 and any corresponding L3 layer/process on the eUICC 120) can provide authorization services. In some example embodiments, two or more of the L1 entity 110, L2 entity 112, and L3 entity 114 can be implemented as a logical software entity running on a common physical server or set of servers. Alternatively, in some example embodiments, individual logical security entity, such as individual ones of the L1 entity 110, L2 entity 112, and/or L3 entity 114 can be implemented on physical servers that are discrete from servers implementing another logical security entity.

Figure 2:
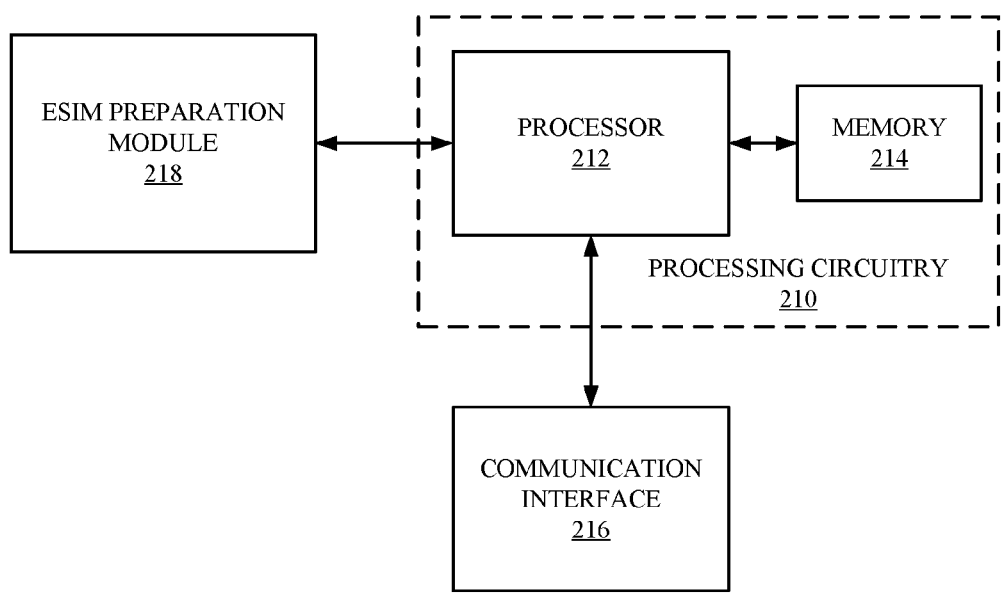
FIG. 2 illustrates a block diagram of an apparatus that can be implemented on a provisioning server in accordance with some example embodiments.

FIG. 2 illustrates a block diagram of an apparatus 200 that can be implemented on a provisioning server, such as provisioning server 102, in accordance with some example embodiments. In this regard, the apparatus 200 can be implemented on any computing device or plurality of computing devices that can collectively be configured to implement functionality of the provisioning server 102. It will be appreciated that one or more of the components illustrated in and described with respect to FIG. 2 can be implemented on a single computing device, or can be distributed across a plurality of computing devices that may collectively provide functionality of the provisioning server 102 in accordance with one or more example embodiments. It will additionally be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of a provisioning server, such as provisioning server 102, in accordance with various example embodiments. Thus, the processing circuitry 210 may be configured to perform data processing, application execution and/or other processing and management services that can be implemented for preparing and provisioning an eSIM according to one or more example embodiments, such as illustrated in and described below with respect to FIGS. 4A-4C and 5-7.

In some embodiments, the apparatus 200 or a portion(s) or component(s) thereof, such as the processing circuitry 210, can be implemented via one or more integrated circuits, each of which can include one or more chips. The processing circuitry 210 and/or one or more further components of the apparatus 200 can therefore, in some instances, be configured to implement an embodiment on an integrated circuit (e.g., as a "system on a chip").

In some example embodiments, the processing circuitry 210 can include a processor 212 and, in some embodiments, such as that illustrated in FIG. 2, can further include memory 214. The processing circuitry 210 can be in communication with or otherwise control a communication interface 216 and/or eSIM preparation module 218.

The processor 212 can be embodied in a variety of forms. For example, the processor 212 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the provisioning server 102. In some embodiments in which the apparatus 200 is embodied on a plurality of computing devices, a plurality of processors, which can collectively form the processor 212, can be distributed across a plurality of computing devices that can be in operative communication with each other directly and/or via a network, such as the network 104. In some example embodiments, the processor 212 can be configured to execute instructions that may be stored in the memory 214 and/or that can be otherwise accessible to the processor 212. In this manner, whether configured by hardware or by a combination of hardware and software, the processor 212 can be capable of performing operations according to various embodiments while configured accordingly.

In some example embodiments, the memory 214 can include one or more memory and/or other storage devices. Memory 214 can include fixed and/or removable memory devices. In embodiments in which the memory 214 includes a plurality of memory devices, the plurality of memory devices can be embodied on a single computing device, or can be distributed across a plurality of computing devices (e.g., a plurality of computing devices forming the provisioning server 102 of some example embodiments), which can collectively provide functionality of the apparatus 200. In some embodiments, the memory 214 can comprise a non-transitory computer-readable storage medium that can store computer program instructions that can be executed by the processor 212. In this regard, the memory 214 can be configured to store information, data, applications, instructions and/or the like for enabling the apparatus 200 to carry out various functions of the provisioning server 102 in accordance with one or more example embodiments. For example, the memory 214 of some example embodiments can be configured to store one or more eSIMs that can be available for provisioning to an eUICC, such as eUICC 120. The memory 214 can additionally or alternatively store parameters associated with various eUICCs, which can be used to facilitate preparing and packaging an eSIM for provisioning as described further herein below. In some embodiments, the memory 214 can be in communication with one or more of the processor 212, communication interface 216, or eSIM preparation module 218 via one or more buses for passing information among components of the apparatus 200.

The apparatus 200 can further include a communication interface 216. The communication interface 216 can be configured enable the apparatus 200 to communicate with another computing device, such as over the network 104. In this regard, the communication interface 216 can include one or more interface mechanisms for enabling communication with other devices and/or networks. The communication interface 216 can include, for example, an antenna (or multiple antennas) and supporting hardware and/or software for enabling communications with a wireless communication network (e.g., a cellular network, Wi-Fi, Li-Fi, WLAN, and/or other wireless communication network) and/or a communication modem or other hardware/software for supporting communication via cable, digital subscriber line (DSL), USB, FireWire, Ethernet, one or more optical transmission technologies, and/or other wireline networking methods. Thus, for example, the communication interface 216 can be configured to support communication with the wireless communication device 106 and/or eUICC 120 implemented thereon via the network 104 to enable the provisioning server 102 to participate in an eSIM provisioning session provision and provision an eSIM to the eUICC 120.

The apparatus 200 can further include eSIM preparation module 218. The eSIM preparation module 218 can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the eSIM preparation module 218. The eSIM preparation module 218 of some example embodiments can be configured to prepare and provision an eSIM according to one or more example embodiments, such as illustrated in and described below with respect to FIGS. 4A-4C and 5-7.

Figure 3:
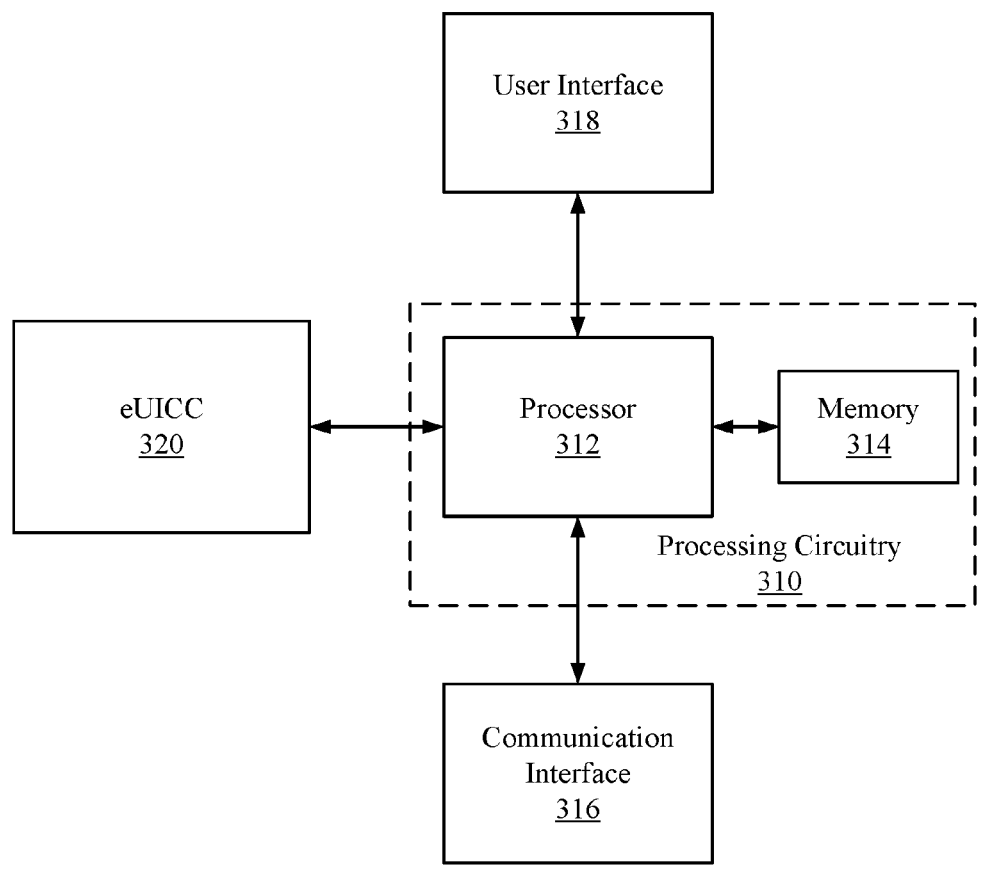
FIG. 3 illustrates a block diagram of an apparatus that can be implemented on a wireless communication device in accordance with some example embodiments.

FIG. 3 illustrates a block diagram of an apparatus 300 that can be implemented on a wireless communication device, such as wireless communication device 106, in accordance with some example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments. For example, in some embodiments, the processing circuitry 310 can be configured to support operation of a main host operating system of a wireless communication device.

In some embodiments, the apparatus 300 or a portion(s) or component(s) thereof, such as the processing circuitry 310, can be implemented via one or more integrated circuits, each of which can include one or more chips. The processing circuitry 310 and/or one or more further components of the apparatus 300 can therefore, in some instances, be configured to implement an embodiment on an integrated circuit (e.g., as a "system on a chip"). In some example embodiments, one or more components of the apparatus 300 can be implemented on a chipset capable of enabling a computing device to access a network, such as network 104, when implemented on or otherwise operably coupled to the computing device. In some such example embodiments, the apparatus 300 can include a cellular baseband chipset, which can be configured to enable a computing device, such as wireless communication device 106, to operate on one or more cellular networks.

In some example embodiments, the processing circuitry 310 can include a processor 312 and, in some embodiments, such as that illustrated in FIG. 3, can further include memory 314. The processing circuitry 310 can be in communication with or otherwise control the communication interface 316 and/or user interface 318.

The processor 312 can be embodied in a variety of forms. For example, the processor 312 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the wireless communication device 106 as described herein. In some example embodiments, the processor 312 can be configured to execute instructions that can be stored in the memory 314 or that can be otherwise accessible to the processor 312. In this manner, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, user interface 318, or eUICC 320 via one or more buses for passing information among components of the apparatus 300.

The apparatus 300 can further include a communication interface 316. The communication interface 316 of some example embodiments can provide a wireless communication interface configured to enable the apparatus 300 to send wireless signals to and receive signals from one or more wireless networks. For example, the communication interface 316 of some example embodiments can be configured to support access to a cellular network by enabling wireless communication with a cellular base station. The communication interface 316 can accordingly include one or more transceivers and supporting hardware and/or software for enabling communication in accordance with one or more cellular RATs. The communication interface 316 of some embodiments can further include one or more transceivers and/or other radio components to support one or more further wireless communication technologies, such as Wi-Fi (e.g., an IEEE 802.11 technology), Bluetooth, and/or other wireless communications technology. In some example embodiments, the communication interface 316 can additionally include a communication modem or other hardware/software for supporting communication via cable, digital subscriber line (DSL), USB, FireWire, Ethernet, one or more optical transmission technologies, and/or other wireline networking methods.

In some example embodiments, the apparatus 300 may include the user interface 318. It will be appreciated, however, that in some example embodiments, one or more aspects of the user interface 318 may be omitted, and in some embodiments, the user interface 318 may be omitted entirely. The user interface 318 can be in communication with the processing circuitry 310 to receive an indication of a user input and/or to provide an audible, visual, mechanical, or other output to a user. In this manner, the user interface 318 can include, for example, a keyboard, a mouse, a joystick, a display, a touch screen display, a microphone, a speaker, one or more biometric input devices, and/or other input/output mechanisms. In embodiments wherein the user interface 318 comprises a touch screen display, the user interface 318 can additionally be configured to detect and/or receive an indication of a touch and/or other movement gesture or other input to the display.

The apparatus 300 can further include the eUICC 320, which can, for example, comprise an embodiment of the eUICC 120. The eUICC 320 can accordingly include processing circuitry and a storage device that can be configured to store and manage one or more eSIMs, such as can be provisioned by the provisioning server 102 in accordance with various example embodiments. The eUICC 320 can be configured to unpack and install an eSIM provisioned by the provisioning server 102 in accordance with various example embodiments, such as those illustrated in FIGS. 4A-4C and 5-7 and described below in greater detail.

Figure 4A:
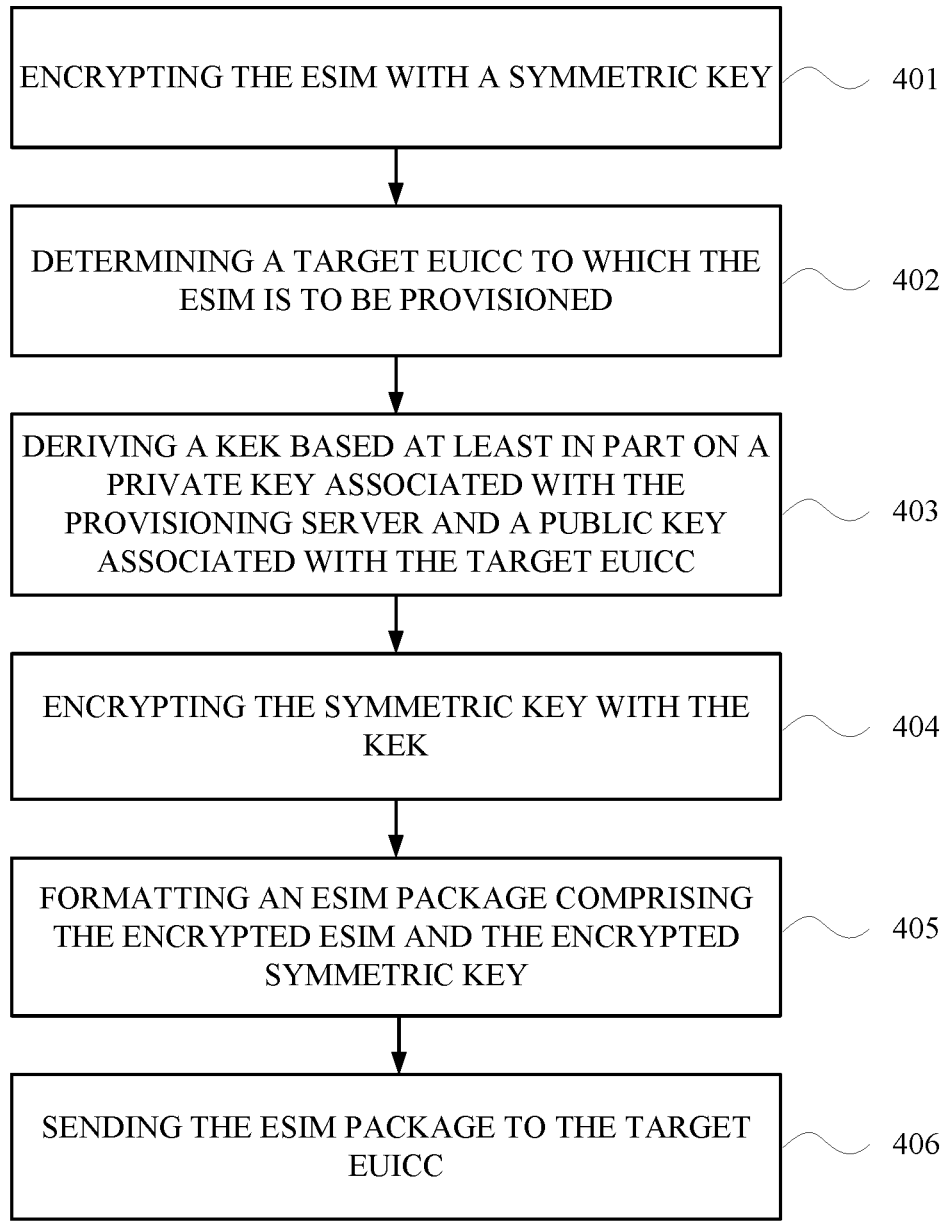
FIGS. 4A-4C illustrate example flows of operations for provisioning a single eSIM to a target eUICC, in accordance with some example embodiments.
Figure 4B:
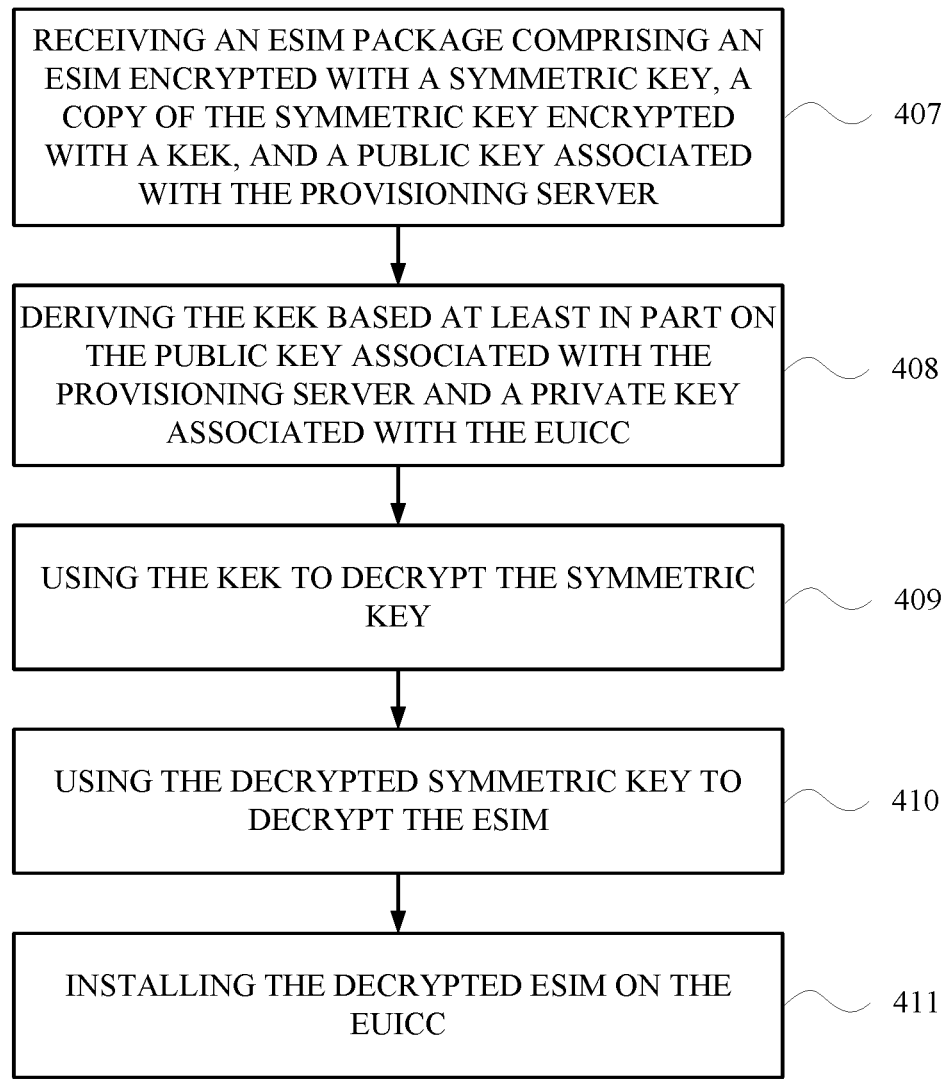
Figure 4C:
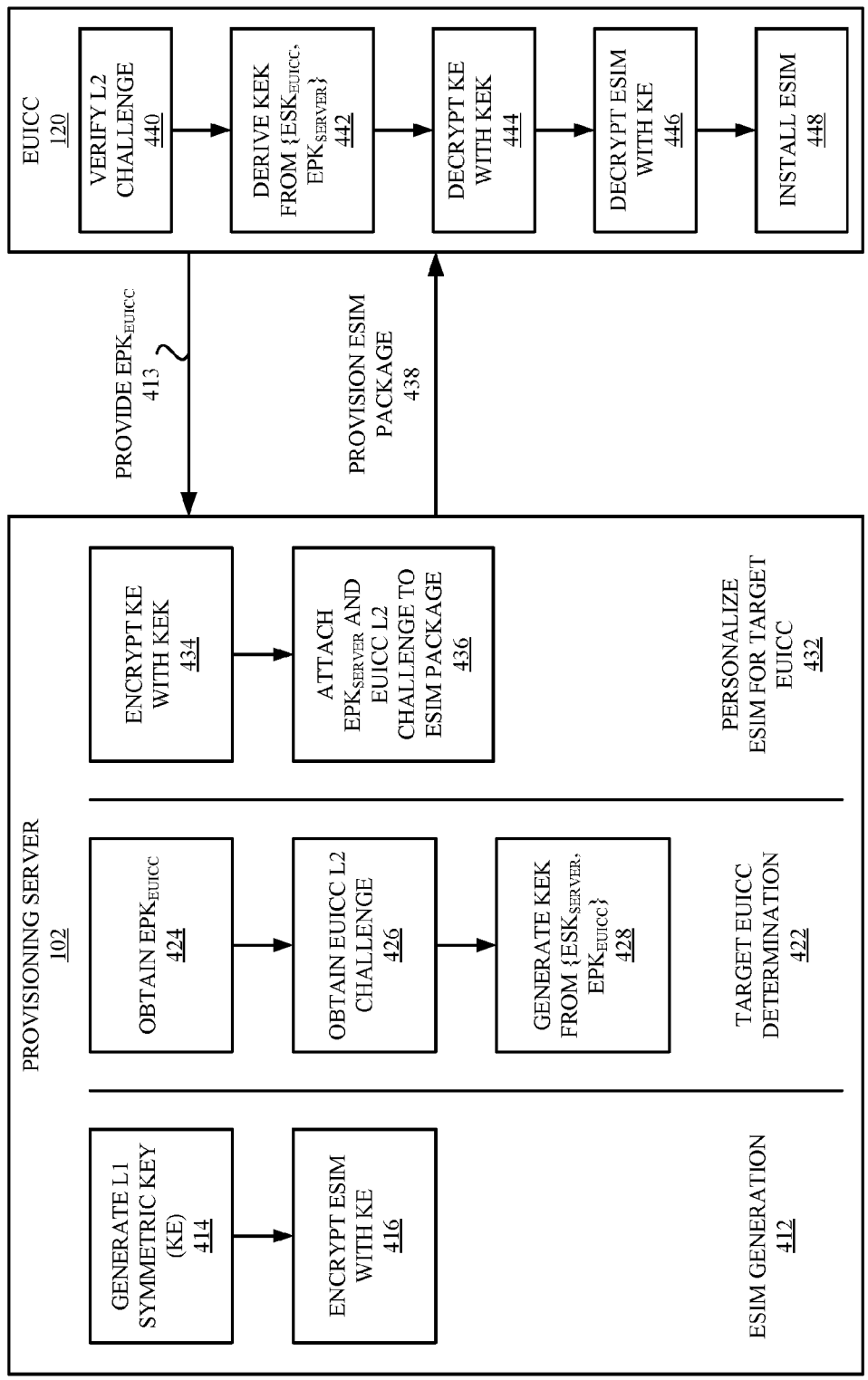

For the purposes of clarity, FIGS. 4A-4C illustrate an approach that can be used to pre-encrypt a single eSIM for a target eUICC in accordance with the various descriptions provided herein. In particular, FIGS. 4A-4B (and their accompanying description) set forth low-level details associated with the pre-encryption and transmission of a single eSIM between a provisioning server and a target eUICC, whereas FIG. 4C (and its accompanying description) sets forth high-level details associated with the pre-encryption and transmission of the eSIM between the provisioning server and the target eUICC. In this manner, the three specific approaches described herein for enabling multiple eSIMs to be pre-encrypted for a targeted eUICC can be more easily understood by isolating and discussing their distinctions to the singular approach described in conjunction with FIGS. 4A-4C. For example, FIG. 5 identifies the changes that occur when utilizing Profile Issuer Security Domains (ISD-Ps) to enable pre-encryption of multiple eSIMs for a target eUICC, FIG. 6 identifies the changes that occur when utilizing copies of ephemeral public keys to enable pre-encryption of multiple eSIMs for a target eUICC, and FIG. 7 identifies the changes that occur when utilizing Message Authentication Codes (MACs) to enable pre-encryption of multiple eSIMs for a target eUICC.

As set forth above, FIG. 4A illustrates a flowchart according to an example method for preparing a single eSIM for provisioning to a target eUICC, in accordance with some example embodiments. Specifically, FIG. 4A illustrates a method that can be performed by the provisioning server 102 of some example embodiments. One or more of processing circuitry 210, processor 212, memory 214, communication interface 216, and eSIM preparation module 218 can, for example, provide means for performing the operations illustrated in and described with respect to FIG. 4A.

As shown in FIG. 4A, operation 401 can include encrypting an eSIM with a symmetric key. The symmetric key can be generic with respect to (e.g., unassociated with) any particular eUICC. In this manner, encryption of the eSIM can be performed prior to and/or otherwise without an immediate identification of a specific target eUICC. In some embodiments, the symmetric key can be a single use key that can be generated for encrypting a single eSIM. Operation 402 can include determining a target eUICC (e.g., the eUICC 120) to which the eSIM is to be provisioned. Operation 410 can, for example, be performed in response to a notification of a manufacture of the eUICC 120. Thus, for example, operation 410 can include retrieving a pre-encrypted eSIM in response to identifying an eUICC 120 that will eventually receive the eSIM.

In some example embodiments, the provisioning server 102 can obtain parameters associated with the eUICC 120. For example, the provisioning server 102 can maintain a database and/or other data structure storing a plurality of parameter sets, each of which can be associated with a respective eUICC 120. The parameters for each such eUICC 120 can, for example, be shared by the eUICC 120 and/or otherwise pre-stored prior to distribution and/or sale of the wireless communication device and, in some cases, can be pre-stored prior to integration of the eUICC into the wireless communication device. In embodiments in which one or more parameters for the eUICC 120 are pre-stored, the parameters can include parameters that can be used to derive a key encryption key (KEK), such as described with respect to operation 403, and/or for otherwise supporting the provisioning of an eSIM to the eUICC 120. In this manner, when the eUICC 120 is determined to be the target eUICC, the corresponding parameter set can be retrieved from memory by the provisioning server 102. For example, in some embodiments, a public key ($PK_{eUICC}$) associated with the eUICC can be used. The public key ($PK_{eUICC}$) can be part of a public-private key pair associated with the eUICC, and a corresponding private key ($SK_{eUICC}$) can be maintained in secret on the eUICC 120. In some embodiments, the public key ($PK_{eUICC}$) can be generated by the eUICC 120 as a "one-time" ephemeral public key, referred to herein as "$ePK_{eUICC}$".

As a further example, one or more security random values, which can be used to support various security levels, and/or information that can be used to calculate such security random values can be pre-stored. These security random values can be single-use values that can be used to implement one or more levels of security for eSIM provisioning. As a more particular example, in some embodiments, a L2 security value, such as an L2 challenge, can be used for L2 security purposes.

Operation 403 can include deriving a key encryption key (KEK). The KEK can be a shared secret that can be independently derivable by the eUICC 120, such as described with respect to FIG. 4B. The KEK can be derived based at least in part on a private key associated with the provisioning server 102 and the public key $PK_{eUICC}$. The private key associated with the provisioning server 102 can be part of a public-private key pair that can be generated by the provisioning server 102. In some example embodiments, the public-private key pair associated with the provisioning server 102 can be an ephemeral key pair that can be generated for one-time use for provisioning the eSIM to the eUICC 120. In some embodiments, the eUICC 120 can furnish a public key value (e.g., provide the $PK_{eUICC}$) to the provisioning server 102 during the provisioning session. The use of "ephemeral" public keys provides for a degree of forward secrecy, and in particular, when both the eUICC 120 and the provisioning server 102 each use "ephemeral" public keys, perfect forward secrecy can be achieved.

Derivation of the KEK can be performed using Diffie-Hellman techniques, the Elliptic Curve Key Agreement Algorithm (ECKA), and/or another key agreement protocol by which a shared secret can be derived. In some example embodiments, the KEK can be derived without requiring real-time involvement of the eUICC 120 (e.g., the KEK can be derived "offline"), as one or more parameters associated with the eUICC 120, such as the $ePK_{eUICC}$, which can be used for derivation of the KEK can be pre-stored by the provisioning server 102. In some example embodiments, the KEK can be derived during the provisioning session. Additionally or alternatively, in some example embodiments, the KEK can be derived prior to initiation of a provisioning session for provisioning the eSIM to the eUICC 120, and can be stored in the parameter set associated with the eUICC 120 and retrieved in response to initiation of the provisioning session.

Operation 404 can comprise encrypting the symmetric key with the KEK. In some example embodiments, operation 404 can be performed in real-time during the provisioning session. Operation 405 can comprise formatting an eSIM package comprising the encrypted eSIM (e.g., as encrypted with the symmetric key in operation 401) and the encrypted symmetric key (e.g., as encrypted with the KEK in operation 404). The eSIM package can further include a public key associated with the provisioning server 102 (e.g., the public key of the public-private key pair including the private key used to derive the KEK). In this regard, the public key can be included to enable the eUICC 120 to derive the KEK, as described with respect to FIG. 4B. In some example embodiments, operation 405 can be performed in real-time during the provisioning session. Operation 406 can include providing the eSIM package to the eUICC 120, such as via the network 104.

It will be appreciated that the operations illustrated in and described with respect to FIG. 4A are not limited to the illustrated order. In this regard, various operations can be performed concurrently and/or in a different order than that illustrated in FIG. 4A. For example, as mentioned, in some embodiments, the KEK can be derived prior to determining the target eUICC (e.g., offline), and thus operation 403 can be performed prior to operation 402, in some example embodiments.

It will be appreciated that any public-key encryption algorithm can be used for shared secret derivation and encryption can be used for derivation of the KEK and encryption of the symmetric key. By way of non-limiting example, Elliptic Curve Cryptography (ECC) techniques can be used, in some example embodiments, for encryption of the symmetric key. ECC can offer advantages in terms of lower processing overhead and increased speed for encrypting the symmetric key compared to alternative techniques. It will be appreciated, however, that other public-key encryption algorithms, such as a Rivest/Shamir/Adleman (RSA) asymmetric algorithm can be used in addition to, or in lieu of, ECC, in accordance with some example embodiments.

FIG. 4B illustrates a flowchart according to an example method for unpacking and installing an eSIM in an eUICC, such as the eUICC 120, in accordance with some example embodiments. Specifically, FIG. 4B illustrates a method that can be performed by the wireless communication device 106/the eUICC 120 of some example embodiments. One or more of processing circuitry 310, processor 312, memory 314, communication interface 316, and eUICC 320 can, for example, provide means for performing the operations illustrated in and described with respect to FIG. 4B.

As shown in FIG. 4B, operation 407 can include the eUICC 120 receiving an eSIM package. The eSIM package can comprise an eSIM encrypted with a symmetric key, a copy of the symmetric key encrypted with a KEK, and a public key associated with the provisioning server 102. In this regard, operation 407 can comprise receiving an eSIM package that can be formatted and sent to the eUICC 120 in accordance with the method described with respect to FIG. 4A.

Operation 408 can comprise the eUICC 120 deriving the KEK based at least in part on the public key associated with the provisioning server and on a private key associated with the eUICC (e.g., $eSK_{eUICC}$). Operation 408 can be performed using any key agreement protocol, such as by way of non-limiting example, Diffie-Hellman techniques, the Elliptic Curve Key Agreement Algorithm (ECKA), and/or other key agreement protocol that can be used to derive a shared secret. However, in accordance with various example embodiments, the KEK can be derived by the eUICC 120 independent of a "real-time" interactive involvement with the provisioning server 102, e.g., based on a combination of parameters known to the eUICC 120 and information included in the provisioned eSIM package provided to the eUICC 120 by the provisioning server 102.

Operation 409 can include the eUICC 120 using the KEK to decrypt the symmetric key included in the eSIM package. Operation 410 can, in turn, include the eUICC 120 using the decrypted symmetric key to decrypt the eSIM. Operation 411 can include the eUICC 120 installing the decrypted eSIM on the eUICC 120.

With reference to FIG. 4C, a provisioning server 102 can prepare and provision an eSIM to an eUICC 120. The provisioning server 102 can be configured to perform an eSIM generation phase 412. The eSIM generation phase 412 can include operation 414, which can include the provisioning server 102 generating an L1 symmetric key (Ke). The eSIM generation phase 412 can further include the provisioning server 102 encrypting an eSIM with the L1 symmetric key Ke, at operation 416. Operation 416 can, for example, correspond to an embodiment of operation 401.

The provisioning server 102 can be further configured to perform parameter determination 422 for the target eUICC (e.g., the eUICC 120). The parameter determination 422 can, for example, be performed in response to establishment of a provisioning session with the eUICC 120. The parameter determination 422 can be performed based at least in part on a pre-stored parameter set associated with the eUICC 120. For example, the provisioning server 102 can access a pre-stored parameter set for the eUICC 120 in response to establishment of the provisioning session. Operation 424 can include the provisioning server 102 determining the ephemeral public key ($ePK_{eUICC}$) for the eUICC 120. The ephemeral public key ($ePK_{eUICC}$) for the eUICC 120 can be part of a one-time ephemeral key pair for using during the particular provisioning session, where a counterpart ephemeral private key ($eSK_{eUICC}$) is stored by and known only to the eUICC 120.

Operation 426 can include the provisioning server 102 determining one or more security random values associated with the eUICC 120. For example, operation 426 can include determining the L2 challenge associated with the eUICC 120. Operation 428 can include the provisioning server 102 performing the server-side key agreement algorithm to derive the KEK. The KEK can be derived by the provisioning server 102 based on a private key ($eSK_{SERVER}$) in a public-private key pair associated with the provisioning server 102 and on the $ePK_{eUICC}$.

The provisioning server 102 can use the results of the parameter determination 422 to perform personalization 432 of the eSIM for the eUICC 120. The personalization 432 can include an encryption operation 434, which can comprise the provisioning server 102 encrypting the L1 symmetric key Ke with the KEK. In this regard, operation 434 can, for example, correspond to an embodiment of operation 404 in FIG. 4A. The personalization 432 can further include operation 436, which can comprise the provisioning server 102 attaching to the eSIM package the ephemeral public key ($ePK_{SERVER}$) of the public-private key pair associated with the provisioning server 102 and the L2 challenge for the eUICC 120.

Returning to FIG. 4B, the final resulting eSIM package can be provisioned to the eUICC 120, in operation 438. The eUICC 120 can then unpack and install the eSIM in accordance with operations 440-448, described below in greater detail.

The eUICC 120 can be configured to use the L2 challenge to verify integrity of the eSIM package at operation 440. If the L2 challenge is successfully verified, unpacking and installation of the eSIM can continue with operation 442. Operation 442 can include the eUICC 120 running the eUICC-side key agreement to derive the shared secret, e.g., to derive the KEK. This derivation can, for example, be based on an ephemeral private key ($eSK_{eUICC}$) associated with the eUICC 120 and on the ephemeral public key of the server $ePK_{SERVER}$. The ephemeral private key $SK_{eUICC}$ can be a private key corresponding to the ephemeral public key $ePK_{eUICC}$, where the ephemeral private key can be used by the provisioning server 102 for server-side derivation of the KEK.

Operation 444 can include the eUICC 120 decrypting the L1 symmetric key Ke 704 with the KEK. In this regard, operation 444 can, for example, correspond to an embodiment of operation 409 of FIG. 4B. After decrypting the L1 symmetric key Ke 704, the eUICC 120 can use the L1 symmetric key Ke 704 to decrypt the eSIM at operation 446. Operation 446 can, for example, correspond to an embodiment of operation 410. Operation 448 can comprise the eUICC 120 installing the eSIM. In this regard, operation 448 can, for example, correspond to an embodiment of operation 411.

Accordingly, FIGS. 4A-4C illustrate an approach that can be used to pre-encrypt a single eSIM for the eUICC 120 in accordance with the various descriptions provided herein. However, the embodiments set forth herein are directed to approaches that enable a provisioning server to pre-encrypt multiple eSIMs for the eUICC 120.

Figure 5:
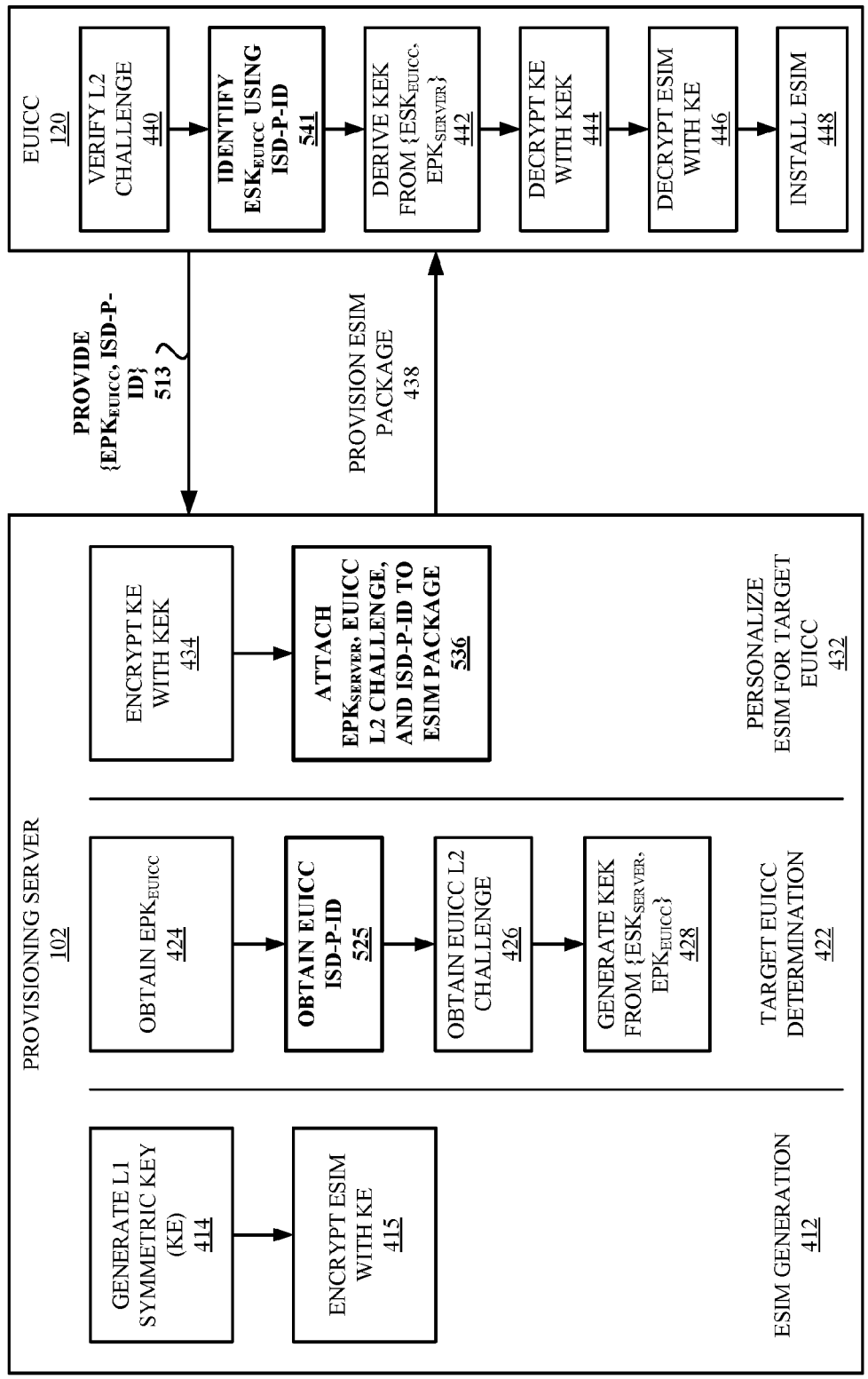
FIG. 5 illustrates an example flow of operations for provisioning multiple eSIMs to a target eUICC by utilizing Profile Issuer Security Domains (ISD-Ps), in accordance with some example embodiments.

FIG. 5 illustrates an example flow of operations for provisioning multiple eSIMs to the eUICC 120 by utilizing Profile Issuer Security Domains (ISD-Ps), in accordance with some example embodiments. As shown in FIG. 5, various operations illustrated in FIG. 4C (and described above) remain intact, however operations 513, 525, 536, and 541 are introduced. In particular, operation 513 involves the eUICC 120 providing (e.g., during manufacture), to the provisioning server 102, an ISD-P identifier (ISD-P-ID) in addition to the ephemeral public key. In particular, operation 513 represents the eUICC 120 generating an ISD-P, storing an ephemeral key pair (including the ephemeral public key and a corresponding ephemeral private key), and providing the ephemeral public key and the ISD-P-ID that corresponds to the ISD-P generated within the eUICC 120. It is noted that operation 513 can be carried out in accordance with a number of eSIMs that are to be pre-encrypted for the eUICC 120. For example, if five different eSIMs are to be pre-encrypted for the eUICC 120, then operation 513 is carried out five different times, where each ephemeral key pair and ISD-P is uniquely generated by the eUICC 120.

At operation 525, the provisioning server 102 receives the ISD-P-ID provided by the eUICC 120. As shown in FIG. 5, operation 536 replaces operation 436 of FIG. 4C, and involves including the ISD-P-ID in the eSIM package that is provided to the eUICC 120. In turn, at operation 541, the eUICC 120 can utilize the ISD-P-ID to identify the ISD-P in which the appropriate ephemeral private key is stored, whereupon the remaining operations can be carried out to decrypt the eSIM in accordance with the techniques previously described herein.

Figure 6:
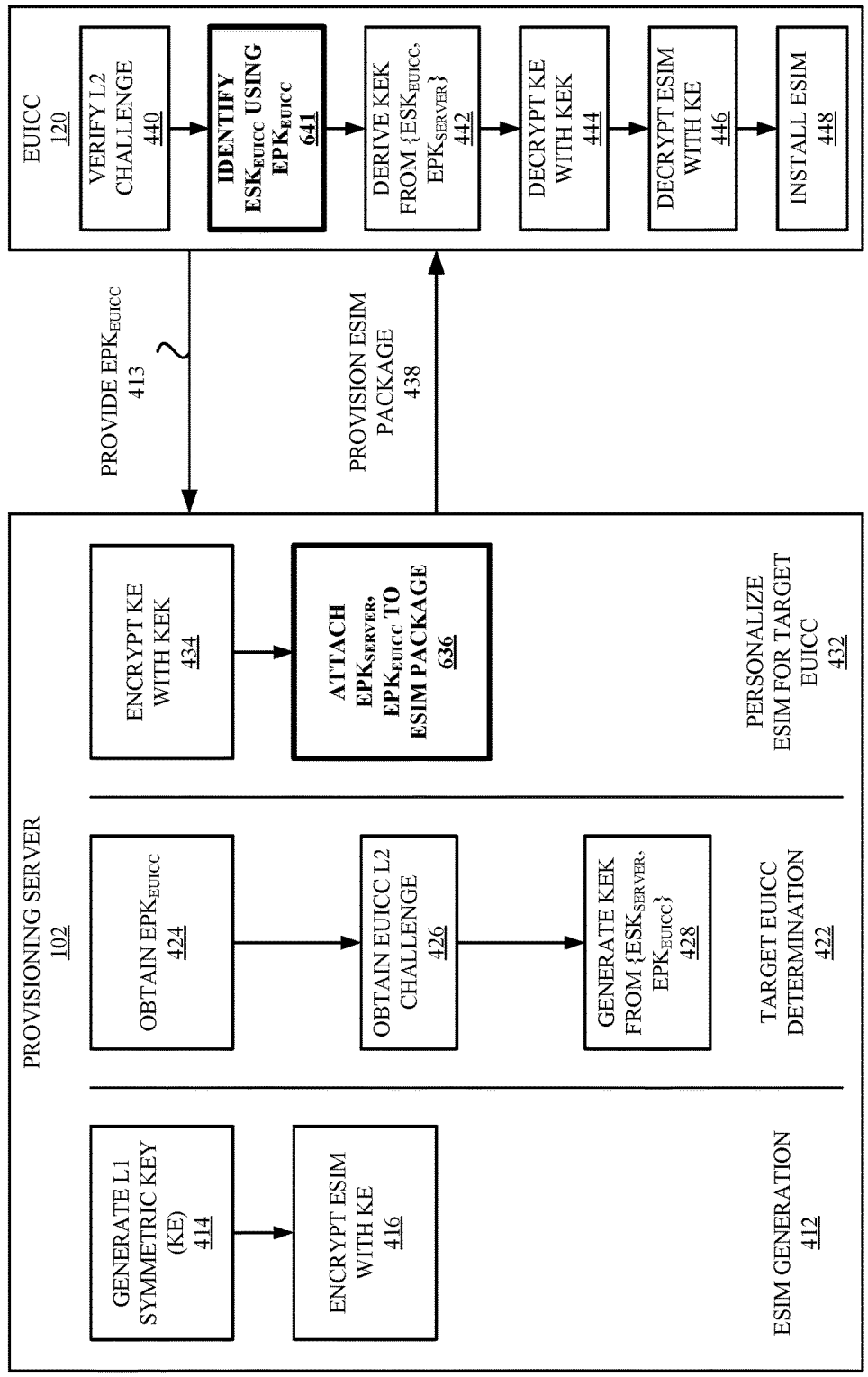
FIG. 6 illustrates an example flow of operations for provisioning multiple eSIMs to a target eUICC by utilizing copies of ephemeral public keys, in accordance with some example embodiments.

FIG. 6 illustrates an example flow of operations for provisioning multiple eSIMs to the eUICC 120 by utilizing copies of ephemeral public keys, in accordance with some example embodiments. As shown in FIG. 6, various operations illustrated in FIG. 4C (and described above) remain intact, however operations 636 and 641 are introduced. In particular, operation 636 involves the provisioning server 102 including, within the eSIM package, the ephemeral public key associated with the eUICC 120 and used to encrypt the eSIM. It is noted that providing this ephemeral public key within the eSIM package can serve as an effective L2 challenge, and, in some cases, can obviate the need to carry out a separate L2 challenge as with other approaches. To implement this functionality, the provisioning server can be configured to store a copy of the ephemeral public key associated with the eUICC 120 after the KEK is generated. In this manner, when the eUICC 120 eventually issues a request to the provisioning server 102 for an eSIM, the provisioning server 102 can recall the ephemeral public key used to generate the KEK and include a copy of the ephemeral public key in the eSIM package. In turn, at operation 641, the eUICC 120 can identify the copy of the ephemeral public key and identify a corresponding ephemeral private key, whereupon the remaining operations can be carried out to decrypt the eSIM in accordance with the techniques previously described herein.

Figure 7:
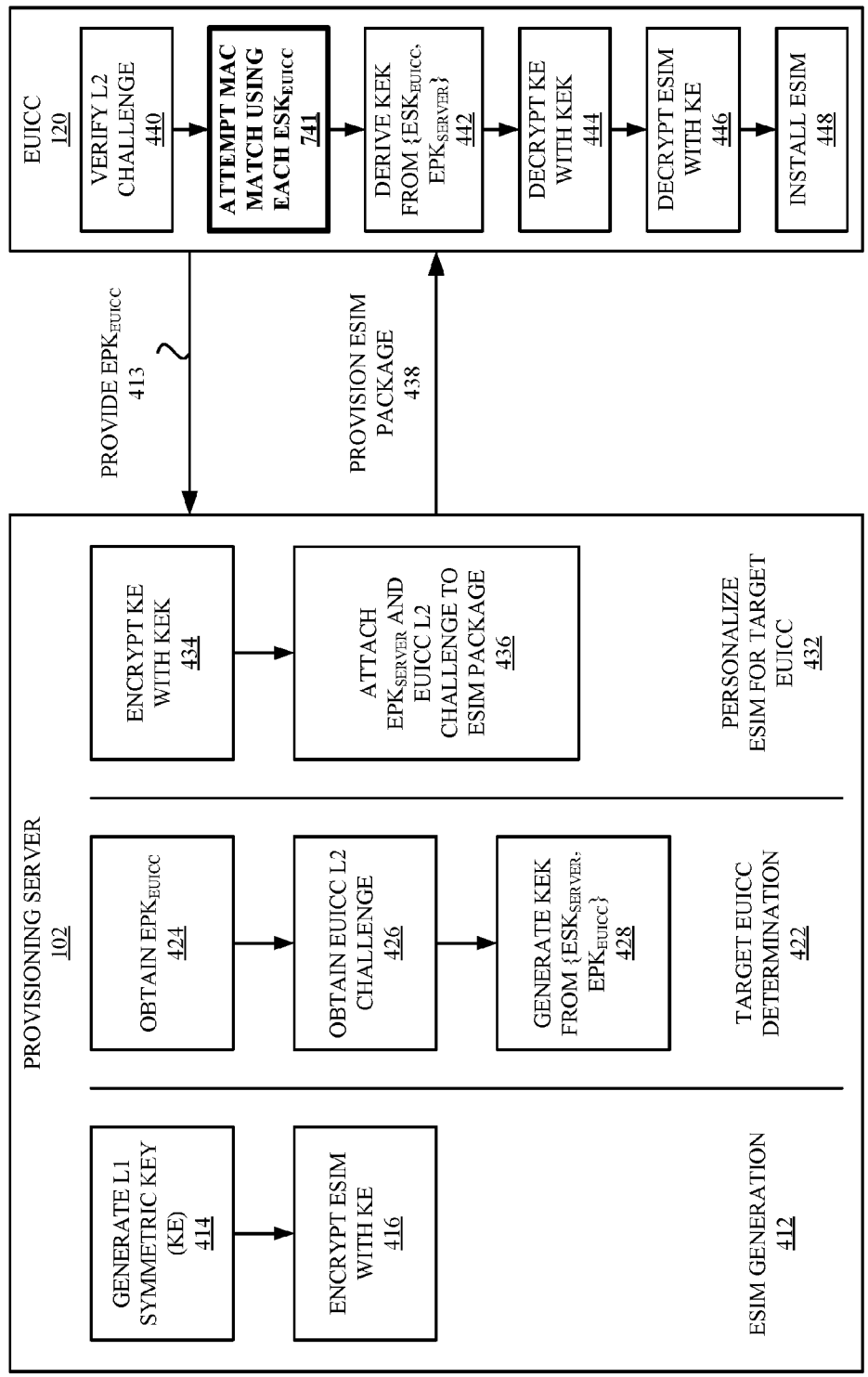
FIG. 7 illustrates an example flow of operations for provisioning multiple eSIMs to a target eUICC by utilizing Message Authentication Codes (MACs), in accordance with some example embodiments.

FIG. 7 illustrates an example flow of operations for provisioning multiple eSIMs to the eUICC 120 by utilizing Message Authentication Codes (MACs), in accordance with some example embodiments. As shown in FIG. 7, operation 741 is introduced, and involves carrying out a brute-force, round-robin approach for identifying the ephemeral private key that is required to successfully decrypt the eSIM included in the eSIM package. In particular, this approach involves exploiting a Message Authentication Code (MAC) included in the eSIM package—specifically, included in a MAC protected partition of the eSIM package. According to some embodiments, the MAC protected partition includes information that is associated with, unique to, and known to the eUICC 120. In this manner, when the eUICC 120 receives the eSIM package, the eUICC 120 can cycle through available ephemeral private keys of previously-generated key pairs (e.g., at manufacture time), and use each ephemeral private key to attempt to verify and match the MAC. In turn, when a match occurs, the eUICC 120 has successfully identified the key pair involved in encrypting the eSIM included in the eSIM package, whereupon the remaining operations can be carried out to decrypt the eSIM in accordance with the techniques previously described herein.

The various aspects, embodiments, implementations or features of the described embodiments can be used separately or in any combination. Various aspects of the described embodiments can be implemented by software, by hardware, or by a combination of hardware and software. The described embodiments can also be embodied as a computer readable medium (or mediums) storing computer readable code including instructions that can be performed by one or more computing devices. The computer readable medium may be associated with any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for provisioning an electronic Subscriber Identity Module (eSIM) to a wireless communication device, the method comprising, at a provisioning server:
   encrypting the eSIM with a symmetric key (Ke) to produce an encrypted eSIM;
   after producing the encrypted eSIM, identifying a target embedded Universal Integrated Circuit Card (eUICC) to which the encrypted eSIM is to be provided;
   generate a key encryption key (KEK) based at least in part on:
      (i) a private key associated with the provisioning server, and
      (ii) a public key associated with the target eUICC;
   encrypting the Ke with the KEK to produce an encrypted Ke;
   generating an eSIM package that includes:
      the encrypted eSIM,
      the encrypted Ke,
      the public key associated with the target eUICC, and
      a public key that corresponds to the private key associated with the provisioning server;
   establishing an eSIM provisioning session with a mobile device in which the target eUICC is included; and
   providing the eSIM package to the target eUICC to enable the mobile device to access wireless services.

2. The method of claim 1, wherein the provisioning server identifies the target eUICC in response to establishing the eSIM provisioning session with the target eUICC.

3. The method of claim 1, wherein the eSIM emulates the functionality of a conventional physical SIM card.

4. The method of claim 1, wherein, when the eSIM provisioning session is a real-time eSIM provisioning session, the provisioning server encrypts the Ke and generates the eSIM package during the real-time eSIM provisioning session.

5. The method of claim 1, wherein the private key associated with the provisioning server and corresponding public key are an ephemeral key pair generated for provisioning the eSIM to the target eUICC.

6. The method of claim 1, wherein the provisioning server identifies the target eUICC and generates the KEK at a time the target eUICC is manufactured.

7. The method of claim 1, further comprising:
   obtaining a level 2 (L2) challenge associated with the target eUICC; and
   generating a response to the L2 challenge, wherein the eSIM package further includes the response.

8. A wireless communication device configured to receive an electronic Subscriber Identity Module (eSIM) from a provisioning server, the wireless communication device comprising an electronic Universal Integrated Circuit Card (eUICC) configured to carry out steps that include:
   establishing an eSIM provisioning session with the provisioning server;
   receiving, from the provisioning server, an eSIM package that includes:
      a symmetric key (Ke) in an encrypted form using a key encryption key (KEK);
      an eSIM in an encrypted form using the Ke, wherein the provisioning server encrypts the eSIM with the Ke prior to receiving a public key ($PK_{eUICC}$) associated with the eUICC;
      the $PK_{eUICC}$ associated with the eUICC, and
      a public key ($PK_{Server}$) associated with the provisioning server;
   identifying, among a plurality of private keys managed by the eUICC, a private key ($SK_{eUICC}$) that corresponds to $PK_{eUICC}$;
   deriving the KEK based at least in part on:
      (i) the identified $SK_{eUICC}$, and
      (ii) the $PK_{Server}$;

decrypting the encrypted Ke using the KEK to produce a decrypted Ke;

decrypting the eSIM using the decrypted Ke; and utilizing the eSIM to access wireless services.

9. The wireless communication device of claim 8, wherein, during a manufacture of the eUICC, the eUICC generates a plurality of key pairs including the $PK_{eUICC}$ and the $SK_{eUICC}$, and provides $PK_{eUICC}$ to the provisioning server.

10. The wireless communication device of claim 9, wherein the steps further include, for each generated key pair:

generating a level 2 (L2) challenge;

storing the L2 challenge with the key pair; and providing the L2 challenge to the provisioning server.

11. The wireless communication device of claim 9, wherein each key pair of the plurality of key pairs is an ephemeral key pair.

12. The wireless communication device of claim 8, wherein the eSIM emulates the functionality of a conventional physical SIM card.

13. The wireless communication device of claim 8, wherein, when the eSIM provisioning session is a real-time eSIM provisioning session, the provisioning server encrypts the Ke and provides the eSIM package during the real-time eSIM provisioning session.

14. The wireless communication device of claim 8, wherein the eSIM functions as a virtualization of a physical SIM card, and the eUICC enables the eSIM to operate on the wireless communication device.

15. A non-transitory computer readable storage medium configured to store instructions that, when executed by an electronic Universal Integrated Circuit Card (eUICC) included in a wireless communication device, cause the eUICC to receive an electronic Subscriber Identity Module (eSIM) from a provisioning server, by carrying out steps that include:

establishing an eSIM provisioning session with the provisioning server;

receiving, from the provisioning server, an eSIM package that includes:

a symmetric key (Ke) in an encrypted form using a key encryption key (KEK);

an eSIM in an encrypted form using the Ke, wherein the provisioning server encrypts the eSIM with the Ke prior to receiving a public key ($PK_{eUICC}$) associated with the eUICC;

the $PK_{eUICC}$ associated with the eUICC, and a public key ($PK_{Server}$) associated with the provisioning server;

identifying, among a plurality of private keys managed by the eUICC, a private key ($SK_{eUICC}$) that corresponds to $PK_{eUICC}$;

deriving the KEK based at least in part on:

(i) the identified $SK_{eUICC}$, and (ii) the $PK_{Server}$;

decrypting the encrypted Ke using the KEK to produce a decrypted Ke;

decrypting the eSIM using the decrypted Ke; and utilizing the eSIM to access wireless services.

16. The non-transitory computer readable storage medium of claim 15, wherein, during a manufacture of the eUICC, the eUICC generates a plurality of key pairs including the $PK_{eUICC}$ and the $SK_{eUICC}$, and provides $PK_{eUICC}$ to the provisioning server.

17. The non-transitory computer readable storage medium of claim 16, wherein the steps further include, for each generated key pair:

generating a level 2 (L2) challenge;

storing the L2 challenge with the key pair; and providing the L2 challenge to the provisioning server.

18. The non-transitory computer readable storage medium of claim 16, wherein each key pair of the plurality of key pairs is an ephemeral key pair.

19. The non-transitory computer readable storage medium of claim 15, wherein the eSIM emulates the functionality of a conventional physical SIM card.

20. The non-transitory computer readable storage medium of claim 15, wherein, when the eSIM provisioning session is a real-time eSIM provisioning session, the provisioning server encrypts the Ke and provides the eSIM package during the real-time eSIM provisioning session.

* * * * *